(12) United States Patent
Dellock et al.

(10) Patent No.: US 9,664,354 B1
(45) Date of Patent: May 30, 2017

(54) ILLUMINATION ASSEMBLY

(71) Applicant: Ford Global Technologies, LLC, Dearborn, MI (US)

(72) Inventors: Paul Kenneth Dellock, Northville, MI (US); Stuart C. Salter, White Lake, MI (US); Harry Lobo, Canton, MI (US); Michael A. Musleh, Canton, MI (US); Michael Henry Maj, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/041,431

(22) Filed: Feb. 11, 2016

(51) Int. Cl.
| | | |
|---|---|---|
| *B60Q 1/00* | (2006.01) | |
| *B60Q 1/26* | (2006.01) | |
| *B60Q 11/00* | (2006.01) | |
| *F21S 8/10* | (2006.01) | |
| *F21Y 115/30* | (2016.01) | |

(52) U.S. Cl.
CPC ......... *F21S 48/2212* (2013.01); *F21S 48/215* (2013.01); *F21Y 2115/30* (2016.08)

(58) Field of Classification Search
CPC .......... B60Q 1/26; B60Q 1/2619; B60Q 1/30; B60Q 1/302; B60Q 1/56; F21S 48/215; F21S 48/2212
USPC .................... 362/487, 496, 509–510, 540
See application file for complete search history.

(56) References Cited

U.S. PATENT DOCUMENTS

| | | |
|---|---|---|
| 5,053,930 A | 10/1991 | Benavides |
| 5,709,453 A | 1/1998 | Krent et al. |
| 5,839,718 A | 11/1998 | Hase et al. |
| 5,920,150 A | 7/1999 | Crary et al. |
| 6,031,511 A | 2/2000 | DeLuca et al. |
| 6,117,362 A | 9/2000 | Yen et al. |
| 6,299,338 B1 | 10/2001 | Levinson et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

An illumination assembly for a vehicle is provided herein. The illumination assembly includes one or more decorative elements each having a substrate and a film attached thereto. A light source is configured to emit an excitation light. The light source is disposed within a tail-light assembly and the excitation light exits the tail-light assembly through a light transmissive portion towards the decorative element. A first photoluminescent structure is disposed within the decorative element and is configured to convert the excitation light emitted from the light source into a converted light of a different wavelength.

20 Claims, 9 Drawing Sheets

(56) References Cited

U.S. PATENT DOCUMENTS

| | | |
|---|---|---|
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,845,839 B2 | 12/2010 | Collier |
| 7,862,220 B2 | 1/2011 | Cannon et al. |
| 7,937,865 B2 | 5/2011 | Li et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,585,263 B2 | 11/2013 | Shipman |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2004/0244247 A1 | 12/2004 | Bolta |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0055055 A1 | 3/2012 | Kunowski |
| 2012/0104954 A1 | 5/2012 | Huang |
| 2012/0138874 A1 | 6/2012 | Yuan et al. |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0240999 A1 | 8/2014 | Roberts et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0047238 A1 | 2/2015 | Shipman |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

ILLUMINATION ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, an illumination assembly for a vehicle is disclosed. The illumination assembly includes one or more decorative elements each having a substrate and a film attached thereto. A light source is configured to emit an excitation light. The light source is disposed within a tail-light assembly and the excitation light exits the tail-light assembly through a light transmissive portion towards the decorative element. A first photoluminescent structure is disposed within the decorative element and is configured to convert the excitation light emitted from the light source into a converted light of a different wavelength.

According to another aspect of the present invention, an illuminable decorative element for a vehicle is disclosed. The illuminable decorative element includes a film having a base layer, a decorative layer, and a protective layer. A substrate is integrally attached to the base layer of the film. The substrate includes a photoluminescent structure configured to emit a converted light in response to receiving an excitation light emitted from a light source. An adhesive coating is disposed between the substrate and a vehicle body panel.

According to another aspect of the present invention, a vehicle is disclosed. The vehicle includes an illumination assembly including one or more decorative elements. Each decorative element includes a photoluminescent structure configured to emit a converted light in response to receiving an excitation light. The vehicle further includes a vehicle lighting assembly having one or more light sources therein. A first portion of excitation light is emitted through a lens in the lighting assembly. A second portion of excitation light is emitted through a transmissive portion towards the illumination assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination assembly for a vehicle. The illumination assembly may include one or more independently illuminated decorative elements. The decorative elements may include one or more photoluminescent structures configured to convert excitation light received from an associated light source to a converted light at a different wavelength typically found in the visible spectrum.

Figure 1A:
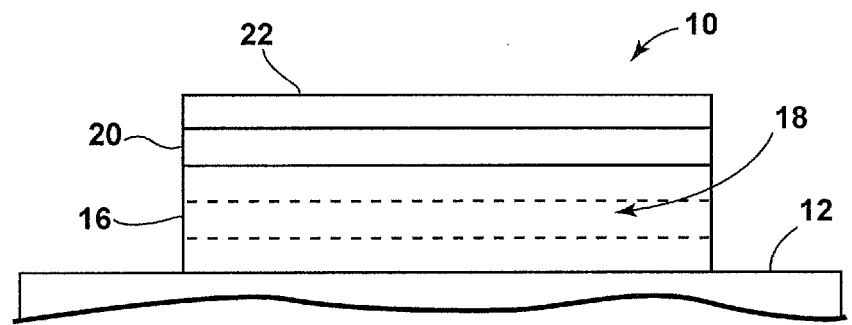
FIG. 1A is a side view of a photoluminescent structure rendered as a coating for use in a vehicle badge according to one embodiment.
Figure 1B:
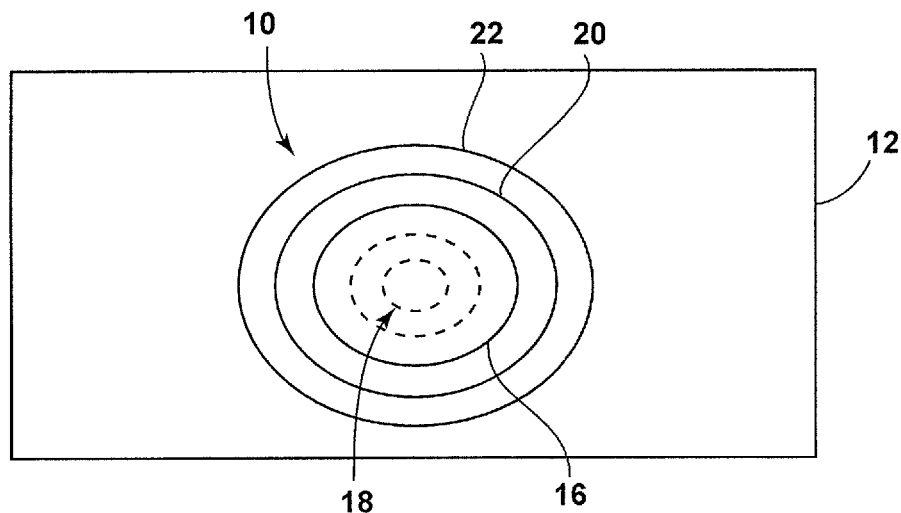
FIG. 1B is a top view of a photoluminescent structure rendered as a discrete particle according to one embodiment.
Figure 1C:
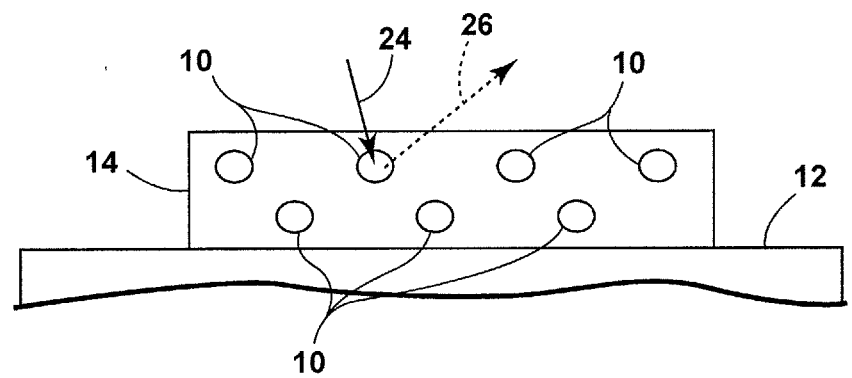
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 82 (FIG. 8) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium 14. For example, the energy conversion layer 16 may be rendered by dispersing the photoluminescent material 18 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has a ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 82. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistent phosphorescent material that emits the converted light 26, once charged by the excitation light 24. The excitation light 24 may be emitted from any excitation source (e.g., any natural and/or artificial light source). The long persistent phosphorescent material may be defined as having a long decay time due to its ability to store the excitation light 24 and release the converted light 26 gradually, for a period of several minutes or hours, once the excitation light 24 is no longer present.

The long persistent phosphorescent material, according to one embodiment, may be operable to emit light at or above an intensity of 0.32 mcd/m² after a period of 10 minutes. Additionally, the long persistent phosphorescent material may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistent phosphorescent material may continually illuminate in response to excitation from a plurality of light sources that emit the excitation light 24, including, but not limited to, natural light sources (e.g., the sun) and/or any artificial light source 82. The periodic absorption of the excitation light 24 from any excitation source may provide for a substantially sustained charge of the long persistent phosphorescent material to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistent phosphorescent material may correspond to alkaline earth aluminates and silicates, for example doped di-silicates, or any other compound that is capable of emitting light for a period of time once the excitation light 24 is no longer present. The long persistent photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long long persistent phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistent phosphor known in the art may also be utilized without departing from the teachings provided herein.

Additional information regarding the production of long persistent photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
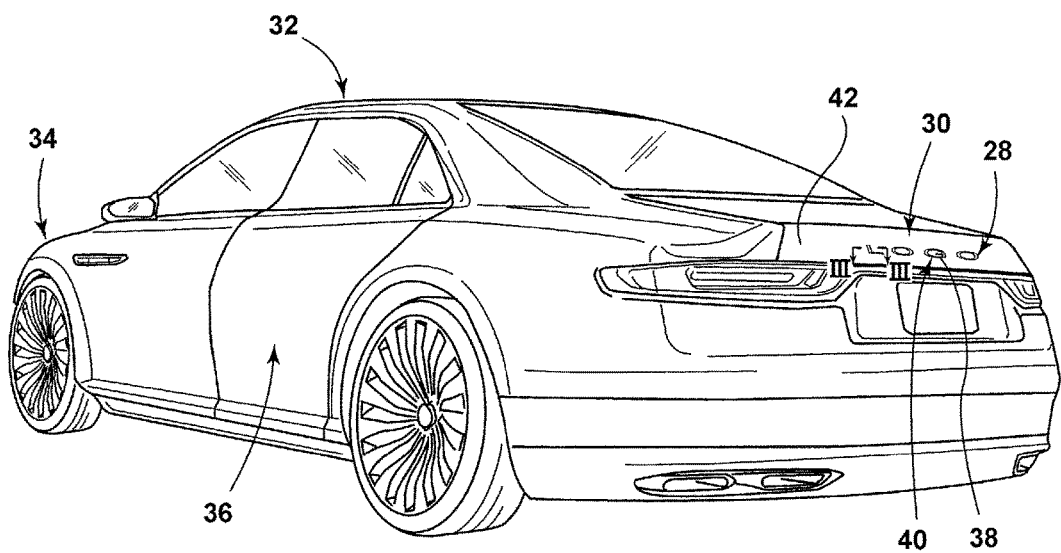
FIG. 2 illustrates an illumination assembly including one or more decorative elements mounted to a rear portion of a vehicle.

Referring to FIG. 2, an illumination assembly 28 is generally shown mounted on a rear portion 30 of a vehicle 32. In other embodiments, the illumination assembly 28 may be located elsewhere, such as, but not limited to, a front portion 34 or side portion(s) 36 of the vehicle 32. Alternatively, the illumination assembly 28 may be disposed inside the vehicle 32. The illumination assembly 28 may include one or more decorative elements 38 that may be configured as an insignia that is presented as an identifying mark of a vehicle manufacturer, make, or any other desired information. The decorative element 38 includes a viewable portion 40 that may be generally displayed once attached to the vehicle 32 on any body panel on the vehicle 32. In the presently illustrated embodiment, the illumination assembly 28 is disposed on a trunk lid 42 of the vehicle 32, thus allowing the illumination assembly 28 to be readily viewed by an observer looking at the rear portion 30 of the vehicle 32. As will be described below in greater detail, the illumination assembly 28 may illuminate to provide a distinct styling element to the vehicle 32.

Figure 3:
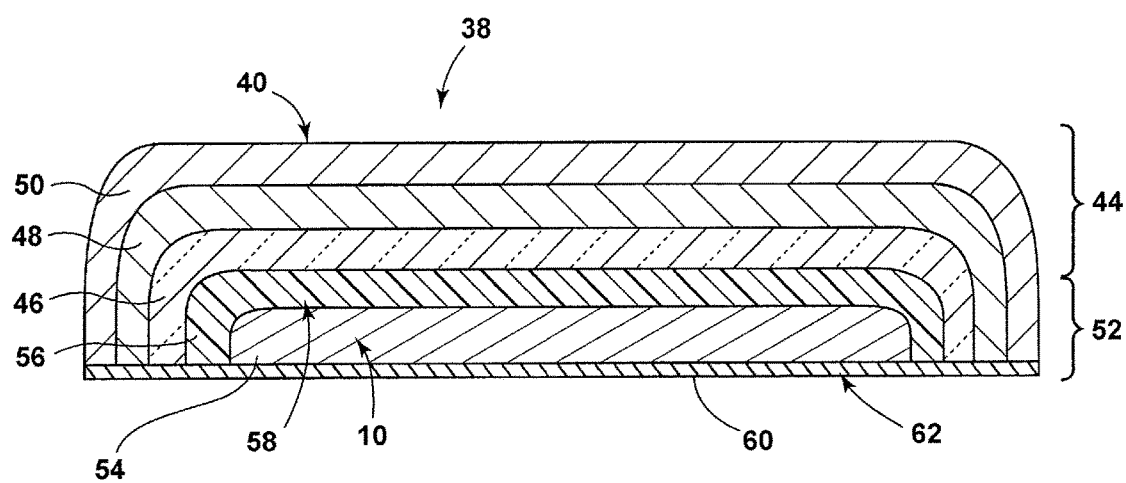
FIG. 3 is a cross-sectional view of the decorative element taken along line of FIG. 2 having a film and a substrate attached thereto, according to one embodiment.

Referring to FIG. 3, a cross section of one decorative element 38 taken along the line III-III of FIG. 2 is exemplarily shown, according to one embodiment. As illustrated, the decorative element 38 includes a film 44 that forms the viewable portion 40, or A-surface, of the decorative element 38.

The film 44, according to one embodiment, includes a base layer 46 that may be formed from a soft thermoplastic resin, such as, but not limited to, polypropylene, polystyrene, polyethylene, polyester, acrylic, and/or any combination thereof.

A decorative layer 48 is disposed on the base layer 46. The decorative layer 48 may include a polymeric material or any other suitable material and is configured to control or modify an appearance of the film 44. For example, the decorative layer 48 may be configured to confer a metallic appearance to the viewable portion 40. The metallic appearance can be disposed on the base layer 46 and/or within the base layer 46 through any method known in the art, including, but not limited to, sputter deposition, vacuum deposition (vacuum evaporation coating), electroplating, or directly printed on to the base layer 46 by a computer printer after preparation of the desired pattern through a computer. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

In other embodiments, the decorative layer 48 may be tinted any color to complement the vehicle structure on which the decorative element 38 is to be received. In any event, the decorative layer 48 should be at least partially light transmissible such that the converted light 26 is not prevented from illuminating the viewable portion 40 whenever an energy conversion process is underway.

A protective layer 50 may be disposed over the decorative layer 48. The protective layer 50 may protect the decorative layer 48 and/or base layer 46 from physical and chemical damage arising from environmental exposure. The protective layer 50 may have viscoelasticity (i.e. having both viscosity and elasticity), a low Young's modulus, and/or a high failure strain so that the film 44 may be formed through various manufacturing process, including, but not limited to, thermoforming, vacuum forming, and/or in-mold decorating.

According to one embodiment, the film 44 is attached to a substrate 52 that may be formed by extrusion, injection molding, compression sealing, calendaring, thermoforming, etc. The substrate 52 may be formed from a polymeric material that includes one or more photoluminescent structures 10 therein and/or thereon. Furthermore, the substrate 52 material may be made of a ultraviolet (UV) stable material, such as an acrylic, or may have a UV stabilizer added thereto.

As illustrated in FIG. 3, the substrate 52 includes a first layer 54 including a first photoluminescent structure 10. The substrate 52 may further include a second layer 56 including a second photoluminescent structure 58. The first photoluminescent structure 10 may include a short persistence photoluminescent material 18, as described above. The second photoluminescent structure 58 may include an alternate photoluminescent material 18 that may be configured to adjust and/or tune the color of the converted light 26 that is emitted from each respective decorative element 38.

An adhesive coating 60 may be disposed on a bottom surface 62 of the substrate 52. The adhesive coating 60 can be any adhesive known in the art. According to one embodiment, the thickness of the adhesive coating 60 may be between 0.0002 to 0.02 inches according to one embodiment. Additionally, or alternatively, the decorative element 38 may include a magnetic layer that temporarily adheres to ferrous exterior body panels of the vehicle 32. The decorative element 38 may also include any permanent adhesive backing or fixing apparatus for permanent application to the vehicle 32.

Figure 4:
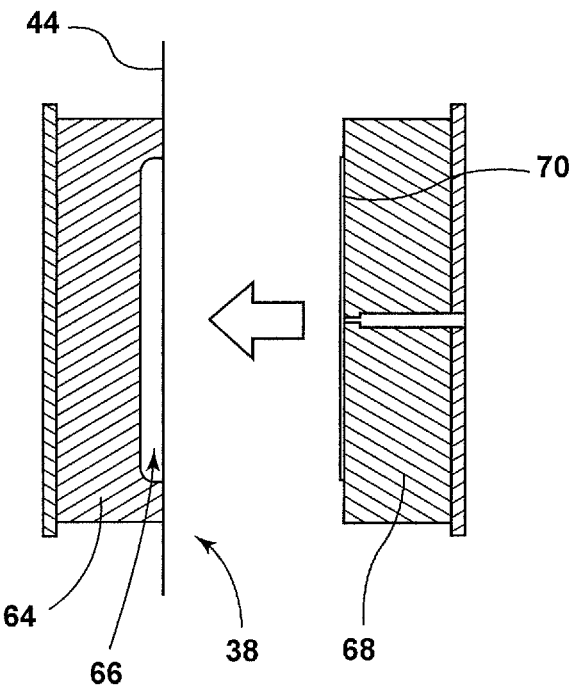
FIG. 4 is a schematic drawing showing the first step of forming a decorative element, according to one embodiment.

Referring to FIGS. 4-7, each decorative element 38 may be formed through the process of in-mold decoration (IMD), according to one embodiment. As illustrated, each decorative element 38 may have a decorative layer 48 and/or protective layer 50 that are to be conferred by the viewable portion 40. The in-mold decoration process includes the step of preparing the film 44, such as the film 44 described above, and attaching the film 44 to a female mold member 64 in front of the cavity 66 of the female mold member 64, as shown in FIG. 4.

Next, a male mold member 68 is closed onto the female mold member 64 to force the mold block 70 of the male mold member 68 against the film 44 and towards the cavity 66 of the female mold member 64. The pressing of the male mold member 68 may press the film 44 into the correct shape. Alternatively, the film 44 may be vacuum formed against the female mold member 64.

Figure 5:
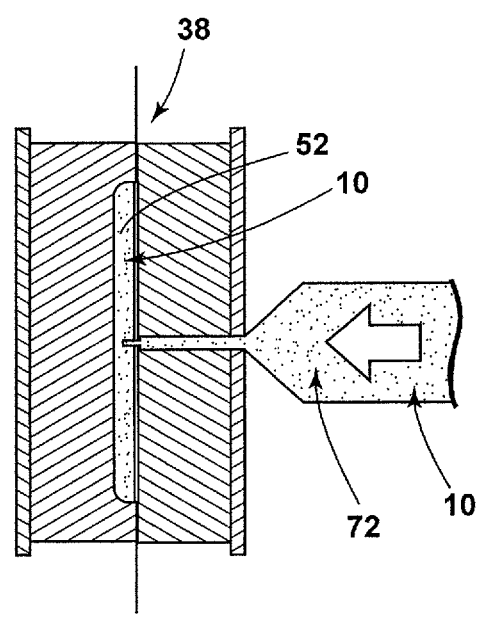
FIG. 5 is a schematic drawing showing the second step of forming a decorative element, according to one embodiment.

A molten plastic material 72, having one or more photoluminescent structures 10 therein, is then filled through the male mold member 68 into the cavity 66 of the female mold member 64 for enabling the applied molten plastic material 72 to be molded on to the film 44, as shown in FIG. 5, thereby forming an integrally formed substrate 52.

Figure 6:
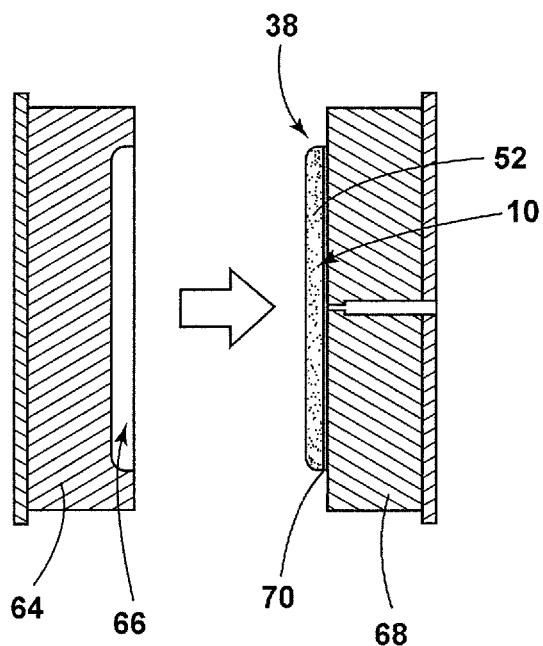
FIG. 6 is a schematic drawing showing the third step of forming a decorative element, according to one embodiment.
Figure 7:
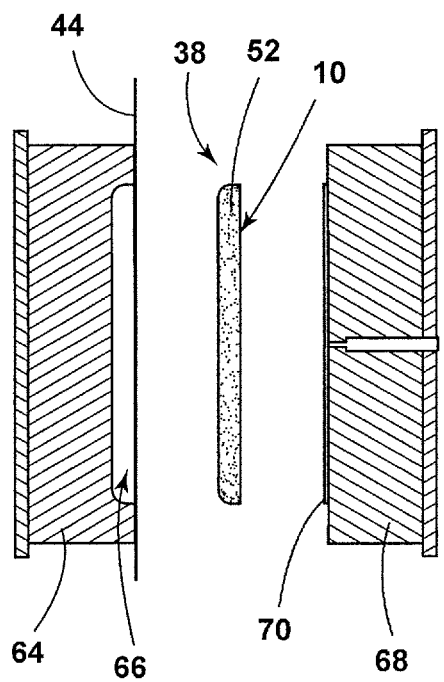
FIG. 7 is a schematic drawing showing the final step of forming a decorative element, according to one embodiment.

Next, the male mold member 68 is separated from the female mold member 64, as shown in FIG. 6. Lastly, the finished decorative element 38 is removed from the mold block 70 of the male mold member 68, as shown in FIG. 7, and a subsequent film 44 is placed in the female mold member 64 for forming the next decorative element 38.

Thus, the decorative element 38 includes a film 44 and an injected substrate 52 that are integrally formed with one another. It will be understood that any other manufacturing process may additionally, or alternatively, be used without departing from the teachings provided herein.

Figure 8:
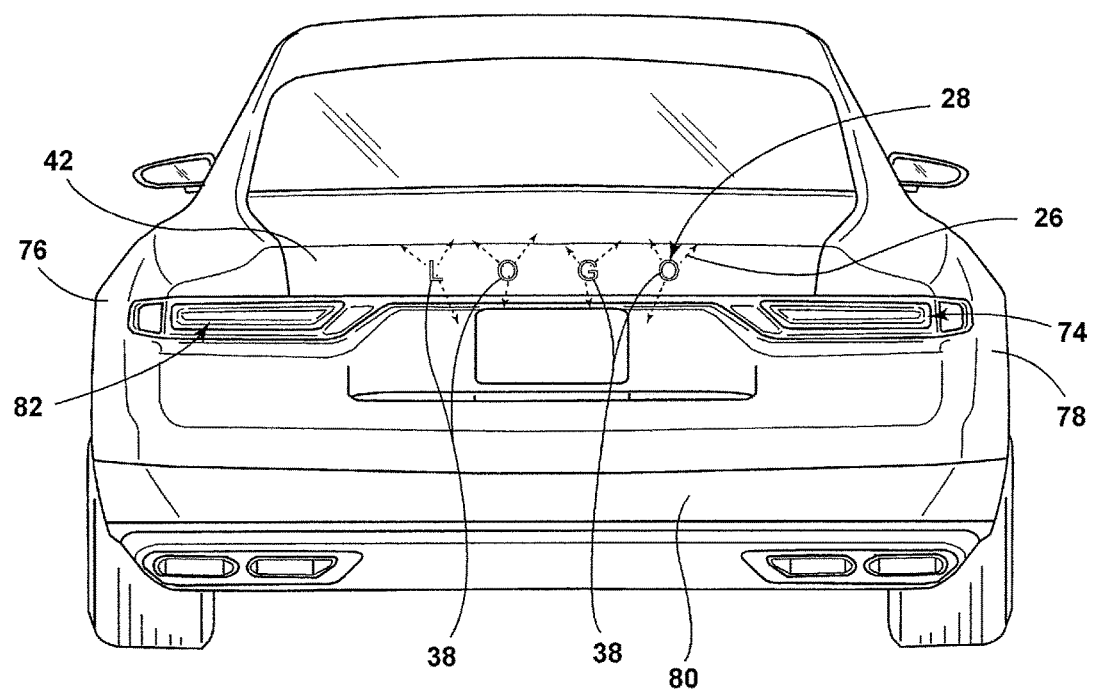
FIG. 8 is a rear perspective view of the vehicle having a plurality of decorative elements disposed proximately to a plurality of light sources that are configured to excite a photoluminescent structure disposed within each decorative element.

Referring to FIG. 8, the vehicle 32 includes the illumination assembly 28 on a rear portion 30 thereof. As described above, the illumination assembly 28 includes a plurality of decorative elements 38. As illustrated, each decorative element 38 is adhered to the trunk lid 42 of the vehicle 32 in a central portion thereof, but, in alternate embodiments, may be mounted on any other body panel of the vehicle 32. Each decorative element 38 includes at least one photoluminescent structure 10. The photoluminescent structure 10 may include a short persistence photoluminescent material 18.

The vehicle 32 also includes at least one light sources 82, which may be within any lighting assembly disposed on and/or within the vehicle 32. For example, the light source may be disposed within the tail-light assembly 74 and may emit excitation light 24 that may be directed towards the illumination assembly 28. Alternatively, the light source 82 may be disposed within and/or on any trim component, body panel, or any other surface of the vehicle 32 without departing from the teachings provided herein. Alternatively still, any number of the decorative elements 38 may be disposed on the component having the light source 82 therein to backlight any of the decorative elements 38.

According to one embodiment, the light source 82 emitting the excitation light 24 may be configured as a light emitting diode (LED) that emits a wavelength of light that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs. Additionally, the light source 82 may include LEDs that are printed onto an interior surface of the tail-light assembly 74. Additional information regarding the construction of vehicle components incorporating printed LEDs therein is disclosed in U.S. patent application Ser. No. 14/851,726 to Salter et al., entitled "ILLUMINATED STEERING ASSEMBLY," filed Sep. 11, 2015, the entire disclosure of which is hereby incorporated herein by reference.

In operation, the photoluminescent material 18 is formulated to become excited upon receiving excitation light of a specific wavelength from the light source 82. As a result, the excitation light 24 undergoes an energy conversion process and is re-emitted at a different wavelength. According to one embodiment, the photoluminescent material 18 may be formulated to convert the excitation light 24 into a longer wavelength light, otherwise known as down conversion. Alternatively, the photoluminescent material 18 may be formulated to convert the excitation light 24 into a shorter wavelength light, otherwise known as up conversion. Under either approach, light converted by the photoluminescent material 18 may be immediately outputted from the photoluminescent structure 10 or otherwise used in an energy cascade, wherein the converted light 26 serves as the excitation light 24 to excite another formulation of photoluminescent material 18 located within the energy conversion layer 16, whereby the subsequent the converted light 26 may then be outputted from the photoluminescent structure 10 or used as the excitation light 24, and so on. With respect to the energy conversion processes described herein, the difference in wavelength between the excitation light 24 and the converted light 26 is known as the Stokes shift and serves as the principle driving mechanism for an energy conversion process corresponding to a change in wavelength of light.

The light source(s) 82 may emit the excitation light 24 at a first and/or a second wavelength, thereby exciting the first and/or the second photoluminescent structures 10, 58. The converted light 26 emitted from the first and/or the second photoluminescent structures 10, 58 may blend thereby emitting an outputted light in a wide range of colors. For example, a substantially white light may be outputted from the illumination assembly 28. In an alternative embodiment, the first and second photoluminescent structures 10, 58 may blend in any color necessary to remove any natural color hue of the illumination assembly 28 based on the material used to create the illumination assembly 28. For example, plastics such as polycarbonate may naturally have a yellowish hue. However, this hue may be masked through the use of the first and/or the second photoluminescent structures 10, 58 thereby making the illumination assembly 28 illuminate and appear in any desired color. Alternatively, any type of light source, multicolored or unicolored, may be utilized to make the illumination assembly 28 illuminate in any desired color without the utilization of the first and/or the second photoluminescent structures 10, 58.

The tail-light assembly 74 may extend vehicle side-to-side along the rear portion 30 of the vehicle 32 and may be bordered by body panels of the vehicle 32 such as the truck lid 34, rear fenders 76 and 78, and/or a bumper assembly 80. As illustrated, a single tail-light assembly 74 extends laterally across a substantial portion of the rear portion 30 of the vehicle 32. However, in alternate embodiments, the tail-light assembly 74 may be of any other size, and the vehicle 32 may include any number of lighting assemblies that together form the tail-light assembly 74 without departing from the teachings provided herein.

The tail-light assembly 74 includes one or more light sources 82. The light sources 82 may be configured as any type of light source and may be configured to confer a plurality of vehicular conditions to proximately located vehicles. For example, the light sources 82 may illuminate when the vehicle 32 is running at night, braking, turning a particular direction, etc.

Figure 9:
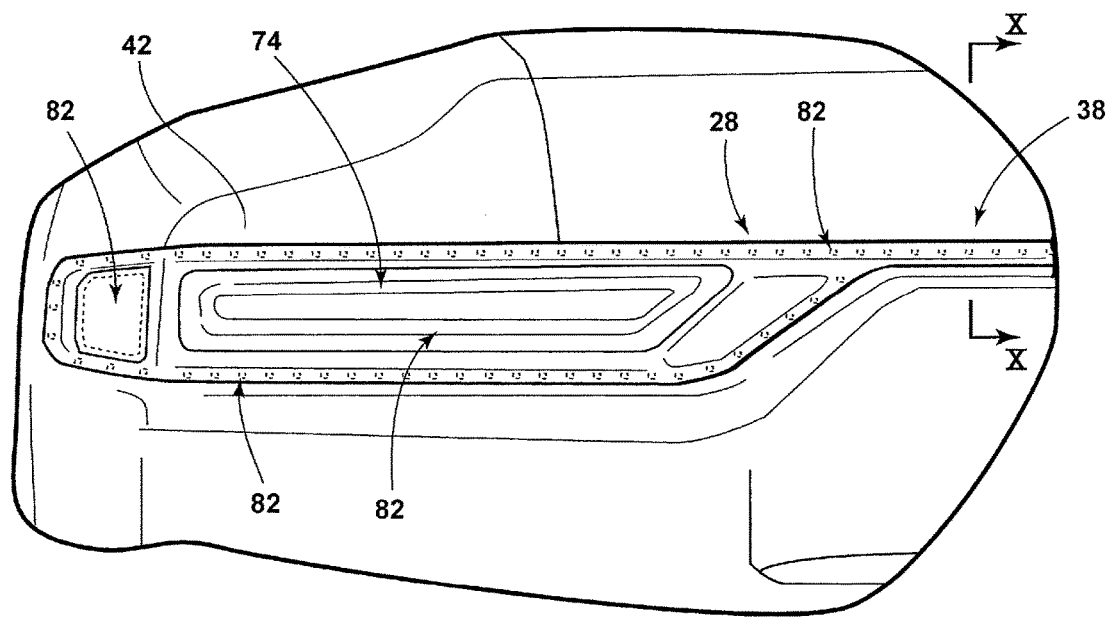
FIG. 9 is a partial perspective view of a tail-light assembly having a plurality of light sources therein, according to one embodiment.
Figure 10:
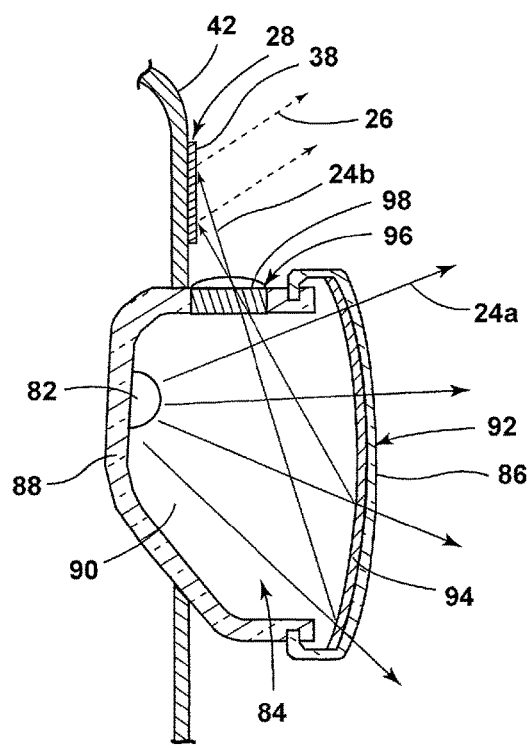
FIG. 10 is a cross-sectional view of the rear portion of the vehicle having the tail-light assembly and illumination assembly taken along line X-X of FIG. 9, according to one embodiment.

Referring to FIGS. 9 and 10, the tail-light assembly 74 is depicted according to one embodiment. The tail-light assembly 74 may produce uniform light emanating from the light sources 82 for use in vehicular tail-light signal functions. As illustrated, the tail-light assembly 74 includes a cavity 84 and lens 86. The cavity 84 is defined by a back portion 88, a pair of side surfaces 90, and a front surface 92 having the lens 86 and a diffuser 94.

As shown in FIGS. 9 and 10, the light sources 82 employed by the tail-light assembly 74 are coupled to the back portion 88 of the cavity 84. Some, or all, of the light sources 82 within the cavity 84 may emit the excitation light 24. The excitation light 24 may be emitted in conjunction with alternate wavelengths of light that are emitted from the light sources 82. Alternatively, dedicated light sources 82 within the cavity 84 may emit the excitation light 24 in response to one or more predefined vehicle conditions while additional light sources 82 may emit light at various wavelengths for conferring vehicular information.

With respect to the embodiment shown in FIG. 10, a first portion of the excitation light 24a emitted from the light sources 82 may be outputted from the lens 86 of the tail-light assembly 74. A second portion of the excitation light 24b may be emitted into the interior of the cavity 84 and become incident therein. As a result, the second portion of the excitation light 24b may be redirected towards a light transmissive portion 96 within the tail-light assembly 74 and transmitted there through. The light transmissive portion 96 may be operably coupled with optics 98 for directing the second portion of the excitation light 24b in any desired direction. Further, it will be appreciated that the light transmissive portion 96 may be of any practical shape and disposed at any location within the tail-light assembly 74 without departing from the teachings provided herein. Furthermore, the light source 82 may be an independent light source 82 or disposed within any assembly on or within the vehicle 32 without departing from the teachings provided herein.

The excitation light 24 emitted through the light transmissive portion 96 is directed towards the one or more decorative element(s) 38. The photoluminescent structure 10 within each decorative element 38 emits the converted light 26 in response to receiving the excitation light 24. Accordingly, the decorative element(s) 38 may illuminate in conjunction with, or independently of, the tail-light assembly 74.

Figure 11:
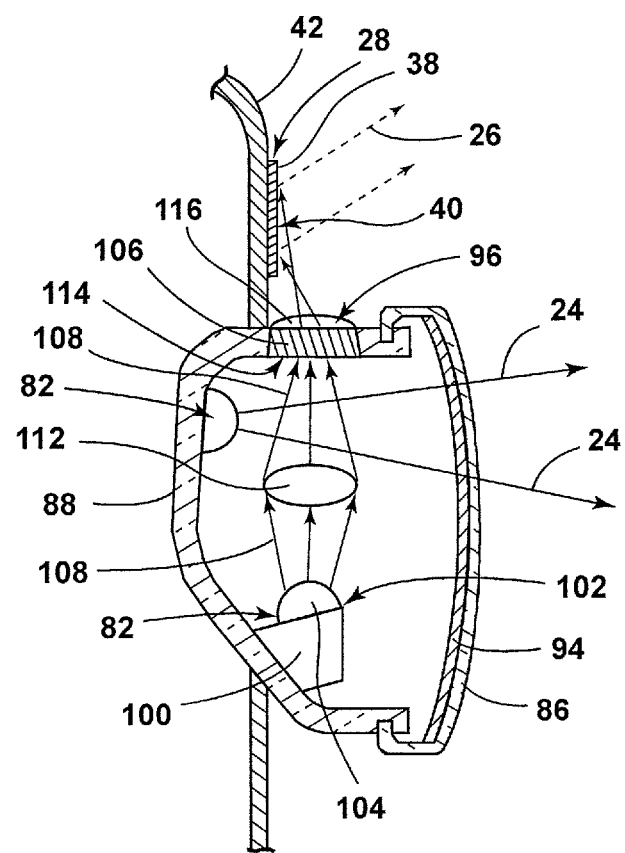
FIG. 11 is a cross-sectional view of the rear portion of the vehicle having the tail-light assembly and illumination assembly taken along line X-X of FIG. 9, according to an alternate embodiment.

Referring to FIG. 11, an alternate embodiment of the illumination assembly 28 is illustrated taken along the line X-X of FIG. 9. As illustrated, one or more light sources 82 within the tail-light assembly 74 are disposed on a member 100 that extends towards the lens 86 of the tail-light assembly 74. At least one light source 82 may be disposed on a top portion 102 of the member 100 and orientated towards the transmissive portion, thereby directing light emitted from the light source 82 towards the one or more decorative elements 38 disposed on the vehicle 32.

According to one embodiment, the light source 82 may be configured as a laser diode. As illustrated in FIG. 11, a single LED 104 is chosen so that its particular emission spectrum 108 is compatible with the absorption band of a transition element doped solid state laser rod 106. This compatibility is such that the light emission 108 from LED 104 will provoke a laser emission 110 in the rod 106. To focus the emission 108 of the LED 104 onto the rod 106, transfer optics 112 may be used. One end 114 of the rod 106 may be coated to permit the light emission 108 to enter the rod 106, while at the same time discouraging a laser wavelength emission 110 from exiting an opposing rod end. A mirror 116 may be provided to create a resonant cavity 84 whose length is dictated by the distance between mirror 116 and the coating at the end 114 of the rod 106. The mirror 116 may be highly reflective at the laser emission 110 wavelength but at the same time is partially transmissive thereto, to allow the laser system to output the laser emission 110, which may correspond to the excitation light 24 that excites the photoluminescent structure 10 within the decorative element 38.

According to one embodiment, the excitation light 24 emitted from the light source(s) 82 is converted by the photoluminescent structure 10 into light of a longer wavelength and outputted therefrom. The converted light 26 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structure 10 may be configured such that the converted light 26 outputted therefrom is capable of being expressed as unicolored or multicolored light. According to one embodiment, the light sources 82 are configured to emit blue light and the photoluminescent structure 10 is configured to convert the blue light into a neutral white light having a color temperature of approximately 4000K to 5000K. The converted light 26 escapes from the illumination assembly 28 via the viewable portion 40. According to one embodiment, the photoluminescent structure 10 is substantially Lambertian, that is, the apparent brightness of the photoluminescent structure 10 is substantially constant regardless of an observer's angle of view. As a consequence, the converted light 26 may be emitted outwardly from the decorative element 38 in numerous directions in a substantially uniform manner.

Figure 12:
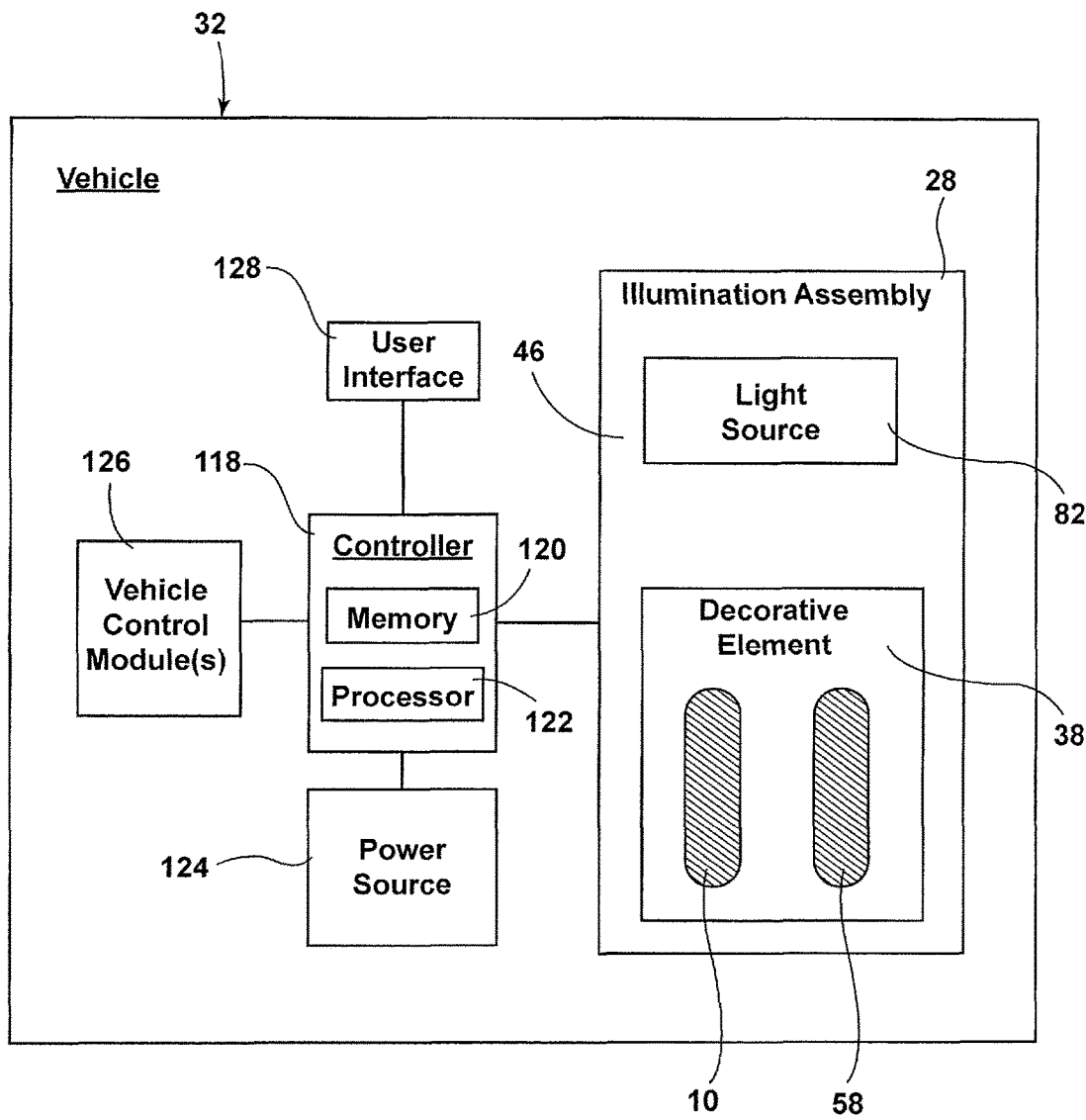
FIG. 12 is a block diagram of the vehicle and the illumination assembly.

Referring to FIG. 12, a block diagram of a vehicle 32 is generally shown in which the illumination assembly 28 is implemented. The illumination assembly 28 includes a controller 118 in communication with the light source 82. The controller 118 may include memory 120 having instructions contained therein that are executed by a processor 122 of the controller 118. The controller 118 may provide electrical power to the light source 82 via a power source 124 located onboard the vehicle 32. In addition, the controller 118 may be configured to control the excitation light 24 emitted from each light source 82 within the illumination assembly 28 based on feedback received from one or more vehicle control modules 126 such as, but not limited to, a body control module, engine control module, steering control module, brake control module, the like, or a combination thereof. By controlling the light output of the light source 82, the illumination assembly 28 may illuminate in a variety of colors and/or patterns to provide an aesthetic appearance or vehicle information to an intended observer. For example, the illumination provided by the illumination assembly 28 may be used for numerous vehicle applications, such as, but not limited to, a car finding feature, a remote start indicator, a door lock indicator, a door ajar indicator, a running light, a brake light indicator, etc.

In operation, the first and/or the second photoluminescent structures 10, 58 receive the excitation light 24 and, in response, emits the converted light 26 therefrom. The first and/or the second photoluminescent structure(s) 10, 58 may contain a short persistent phosphorescent material such that the photoluminescent structure 10, 58 emits the converted light 26 while the excitation light 24 is present, and shortly returns to a unilluminated state thereafter. For example, according to one embodiment, the first and/or the second photoluminescent structure 10, 58 may emit light for 100 milliseconds after the removal of the excitation light 24.

In an alternate embodiment, the light source 82 emits the excitation light 24 at predefined times, such as when the vehicle brakes are initiated, to re-excite the phosphorescent material disposed within the first and/or the second photoluminescent structures 10, 58. Additionally, or alternatively, the light source 82 may emit the excitation light 24 in conjunction with vehicle running lights such that the illumination assembly 28 is illuminated whenever the running lights are illuminated.

The photoluminescent structure(s) 10, 58 may exhibit periodic unicolor or multicolor illumination. For example, the controller 118 may prompt the light source 82 to periodically emit only the first wavelength of excitation light 24 to cause the first photoluminescent structure 10 to periodically illuminate in the first color. Alternatively, the controller 118 may prompt the light source 82 to periodically emit only the second wavelength of excitation light 24 to cause the second photoluminescent structure 58 to periodically illuminate in the second color. Alternatively, the controller 118 may prompt the light source 82 to simultaneously and periodically emit the first and second wavelengths of excitation light 24 to cause the first and second photoluminescent structures 10, 58 to simultaneously illuminate in a third color defined by an additive light mixture of the first and second colors. Alternatively still, the controller 118 may prompt the light source 82 to alternate between periodically emitting the first and second wavelengths of excitation light 24 to cause the first and second photoluminescent structures 10, 58 to periodically illuminate by alternating between the first and second colors. The controller 118 may prompt the light source 82 to periodically emit the first and/or the second wavelengths of excitation light 24 at a regular time interval and/or an irregular time interval.

In another embodiment, the illumination assembly 28 may include a user interface 128. The user interface 128 may be configured such that a user may control the wavelength of excitation light 24 that is emitted by the light source 82. Such a configuration may allow a user to control the illumination patterns of the illumination assembly 28.

With respect to the above examples, the controller 118 may modify the intensity of the emitted first and second wavelengths of excitation light 24 by pulse-width modulation or current control. Also, the controller 118 may vary power to each light source 82 from 1 to 5 times steady state current to vary the color and brightness of each illumination. The controller 118 may also illuminate multiple colors within a single multicolored light source 82 concurrently, thereby producing additional color configurations.

In some embodiments, the controller 118 may be configured to adjust a color of the emitted light by sending control signals to adjust an intensity or energy output level of the light source 82. For example, if the light source(s) 82 are configured to emit the excitation light 24 at a low level, substantially all of the excitation light 24 may be converted to the converted light 26 by the first and/or the second photoluminescent structures 10, 58. In this configuration, a color of light corresponding to the converted light 26 may correspond to the color of the emitted light from the illumination assembly 28. If the light source(s) 82 are configured to emit the excitation light 24 at a high level, only a portion of the excitation light 24 may be converted to the converted light 26 by the first and/or the second photoluminescent structures 10, 58. In this configuration, a color of light corresponding to mixture of the excitation light 24 and the converted light 26 may be output as the emitted light. In this way, the controller 118 may control an output color of the emitted light.

Though a low level and a high level of intensity are discussed in reference to the excitation light 24, it shall be understood that the intensity of the excitation light 24 may be varied among a variety of intensity levels to adjust a hue of the color corresponding to the emitted light from the illumination assembly 28. The variance in intensity may be manually altered, or automatically varied by the controller 118 based on pre-defined conditions. According to one embodiment, a first intensity may be output from the illumination assembly 28 when a light sensor senses daylight conditions. A second intensity may be output from the illumination assembly 28 when the light sensor determines the vehicle 32 is operating in a low light environment.

As described herein, the color of the converted light 26 may be significantly dependent on the particular photoluminescent materials 18 utilized in the first and second photoluminescent structures 10, 58. Additionally, a conversion capacity of the first and second photoluminescent structures 10, 58 may be significantly dependent on a concentration of the photoluminescent material 18 utilized in the photoluminescent structures 10, 58. By adjusting the range of intensities that may be output from the light source(s) 82 the concentration, types, and proportions of the photoluminescent materials 18 in the photoluminescent structures 10, 58 discussed herein may be operable to generate a range of color hues of the emitted light by blending the excitation light 24 with the converted light 26. Moreover, the first and second photoluminescent structures 10, 58 may include a wide range of photoluminescent materials 18 that are configured to emit the converted light 26 for varying lengths of time.

Accordingly, an illuminating assembly for a vehicle has been advantageously described herein. The badge provides various benefits including an efficient and cost-effective means to produce illumination that may function as a distinct styling element that increases the refinement of a vehicle, or any other product that may have an illumination assembly disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illumination assembly for a vehicle, comprising:
   one or more decorative elements each having a substrate and a film attached thereto;
   a light source configured to emit an excitation light, wherein the light source is disposed within a vehicle tail-light assembly and the excitation light exits the tail-light assembly through a light transmissive portion towards the decorative element; and a first photoluminescent structure disposed within the decorative element and configured to convert the excitation light emitted from the light source into a converted light of a different wavelength.

2. The illumination assembly for a vehicle of claim 1, wherein the excitation light comprises at least one of blue light, violet light, IR, and UV light.

3. The illumination assembly for a vehicle of claim 2, wherein the first photoluminescent structure includes at least one photoluminescent material therein configured to down convert or to up convert the excitation light received from at least a portion of the light sources into the visible converted light.

4. The illumination assembly for a vehicle of claim 1, wherein the film includes a base layer, a translucent decorative layer, and a protective layer.

5. The illumination assembly for a vehicle of claim 1, further comprising:
a second photoluminescent structure disposed within the decorative elements, wherein the first photoluminescent structure emits the converted light at a first wavelength and the second photoluminescent structure emits a converted light at a second wavelength.

6. The illumination assembly for a vehicle of claim 5, wherein the light source is configured to emit the excitation light at a plurality of wavelengths such that the first and second photoluminescent structures may be independently excited.

7. A vehicle illuminable decorative element, comprising:
a film including a base layer, a decorative layer, and a protective layer;
a substrate integrally attached to the base layer of the film, wherein the substrate includes a photoluminescent structure configured to luminesce in response to receiving an excitation light emitted from a light source of a tail-light assembly; and
an adhesive coating disposed between the substrate and a vehicle body panel.

8. The decorative element of claim 7, wherein the light source is disposed in a lighting assembly that is separated from the decorative element such that excitation light is emitted along the body panel between the lighting assembly and the decorative element.

9. The decorative element of claim 7, wherein the photoluminescent structure comprises at least one photoluminescent material configured to perform an energy conversion on the excitation light received from at least a portion of the light source into a visible, converted light that is outputted to a viewable portion.

10. The decorative element of claim 7, wherein the photoluminescent structure includes a short persistence photoluminescent material therein that is configured to illuminate for 100 millisecond or less once the light source returns to an unilluminated state.

11. The decorative element of claim 10, wherein the light source is configured as a light-emitting diode.

12. The decorative element of claim 8, wherein the light source is disposed on a member that extends into the lighting assembly such that the light source is directed towards a light transmissive portion and the decorative element.

13. The decorative element of claim 8, further comprising:
a light transmissive portion that is operably coupled with optics for directing the excitation light towards the decorative element.

14. The decorative element of claim 11, wherein the light-emitting diode is configured as a laser diode that includes an LED, optics, and a rod that directs a laser emission towards the decorative element, wherein the laser emission correlates to the excitation light.

15. A vehicle comprising:
an illumination assembly including one or more decorative elements, wherein each decorative element includes a photoluminescent structure configured to luminesce in response to receiving an excitation light; and
a vehicle tail-light assembly having one or more light sources therein, wherein a first portion of excitation light emitted therefrom through a lens and a second portion of excitation light emitted therefrom is directed through a transmissive portion towards the illumination assembly.

16. The vehicle of claim 15, wherein the photoluminescent structure includes a short persistence phosphorescent material.

17. The vehicle of claim 15, wherein the photoluminescent structure includes a long persistence phosphorescent material.

18. The vehicle of claim 15, wherein the excitation light comprises one of blue light, violet light, IR, and UV light.

19. The vehicle of claim 15, wherein the decorative element is formed through an in-mold decoration process such that a film and a substrate are integrally molded to one another.

20. The vehicle of claim 15, wherein the decorative element includes a film having a decorative layer such that the decorative element is reflective when the photoluminescent structure is in a non-luminescent state.

* * * * *